US012764574B2

(12) United States Patent
Howcroft

(10) Patent No.: US 12,764,574 B2
(45) Date of Patent: Oct. 13, 2026

(54) SYSTEMS AND METHODS FOR PROVIDING DIAGNOSTIC AS A SERVICE IN A FIXED WIRELESS NETWORK

(71) Applicant: AT&T Intellectual Property I, L.P., Atlanta, GA (US)

(72) Inventor: Jerald R. Howcroft, Beverly Hills, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 383 days.

(21) Appl. No.: 18/509,546

(22) Filed: Nov. 15, 2023

(65) Prior Publication Data

US 2025/0159511 A1 May 15, 2025

(51) Int. Cl.
*H04W 64/00* (2009.01)
*H04W 24/08* (2009.01)

(52) U.S. Cl.
CPC ......... *H04W 24/08* (2013.01); *H04W 64/006* (2013.01)

(58) Field of Classification Search
None
See application file for complete search history.

(56) References Cited

U.S. PATENT DOCUMENTS

| | | | | |
|---|---|---|---|---|
| 11,350,310 | B2 * | 5/2022 | Gunasekara | H04W 48/16 |
| 2012/0221955 | A1 * | 8/2012 | Raleigh | H04M 15/58 726/1 |
| 2022/0217550 | A1 * | 7/2022 | Sakamoto | H04L 43/50 |
| 2022/0329453 | A1 * | 10/2022 | Sanders | H04N 21/4728 |
| 2022/0377582 | A1 * | 11/2022 | Sakamoto | H04L 41/14 |

* cited by examiner

*Primary Examiner* — Idowu O Osifade

(74) *Attorney, Agent, or Firm* — GUNTIN & GUST, PLC; Colin LaRose

(57) ABSTRACT

Aspects of the subject disclosure may include, for example, systems and methods for providing a diagnostic as service. Home network diagnostic data are obtained by communicating with customer premise equipment (CPE) connected with a mobility network. Mobility network diagnostic data are obtained by communicating with network equipment of the mobility network. Based on the home network diagnostic data and the mobility network diagnostic data, recommended actions are generated and provided as a response to the request for service diagnostic. Other embodiments are disclosed.

20 Claims, 14 Drawing Sheets

280

100

232

240

250

260

280

290

300

600

SYSTEMS AND METHODS FOR PROVIDING DIAGNOSTIC AS A SERVICE IN A FIXED WIRELESS NETWORK

FIELD OF THE DISCLOSURE

The subject disclosure relates to systems and methods for providing diagnostic as a service (DaaS) in fixed wireless network environments.

BACKGROUND

Currently, separate systems complete diagnostic and resolutions for each service channel, leading to inconsistent and disconnected experience for fixed wireless network users. In some cases, when users experience out of service or a poor signal quality, disconnected service channels do not keep track of events and users may need to start over whenever service channels are switched or disconnected. Updating the diagnostic and resolutions may be cumbersome as not all channels are rules based and configurable. Assistance for fixed wireless broadband services may be further limited at least in part because key performance data collected from customer premise equipment (e.g., residential gateways) as well as communication networks are limited or unavailable. No machine learning capabilities are provided for fixed wireless service care which may limit or restrict the ability to diagnose problems.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for systems and methods which provide diagnostic as a service (DaaS) in fixed wireless network environments where the diagnostic as a service (DaaS) is implemented as a centralized orchestration platform that enables common diagnostic and actions across service care channels involving agents, customers, technicians and interactive virtual responses in fixed wireless network environments. Other embodiments are described in the subject disclosure.

One or more aspects of the subject disclosure is directed to a device including a processing system of a diagnostic as services (DaaS) platform, the processing system including a processor, and a memory that stores executable instructions that, when executed by the processing system, facilitate performance of operations. The operations include receiving a request for diagnostic of fixed wireless broadband services from users; obtaining home network diagnostic data by communicating with customer premise equipment (CPE) connected with a mobility network; obtaining mobility network diagnostic data by communicating with network equipment of the mobility network; based on the home network diagnostic data, generating a first recommended action; based on the mobility network diagnostic data, generating a second recommended action; and providing a response to the request for service diagnostic based on the first recommended action, the second recommended action or both.

One or more aspects of the subject disclosure is directed to a non-transitory machine-readable medium, including executable instructions that, when executed by a processing system of a diagnostic as service platform including a processor, facilitate performance of operations. The operations include receiving home network diagnostic data from customer premise equipment (CPE) connected to a mobility network and operating in a fixed wireless broadband network; receiving network data from mobility network equipment; receiving a request for diagnostic of fixed wireless broadband services; sending, to customer premise equipment (CPE), real time queries in response to the request for diagnostic of the fixed wireless broadband services; receiving a response to the real time queries from the customer premise equipment (CPE); receiving customer premise equipment (CPE) data included in a daily bulk feed; and upon detection of anomalies in the response, the daily bulk feed or both, generating a set of recommended actions.

Figure 1:
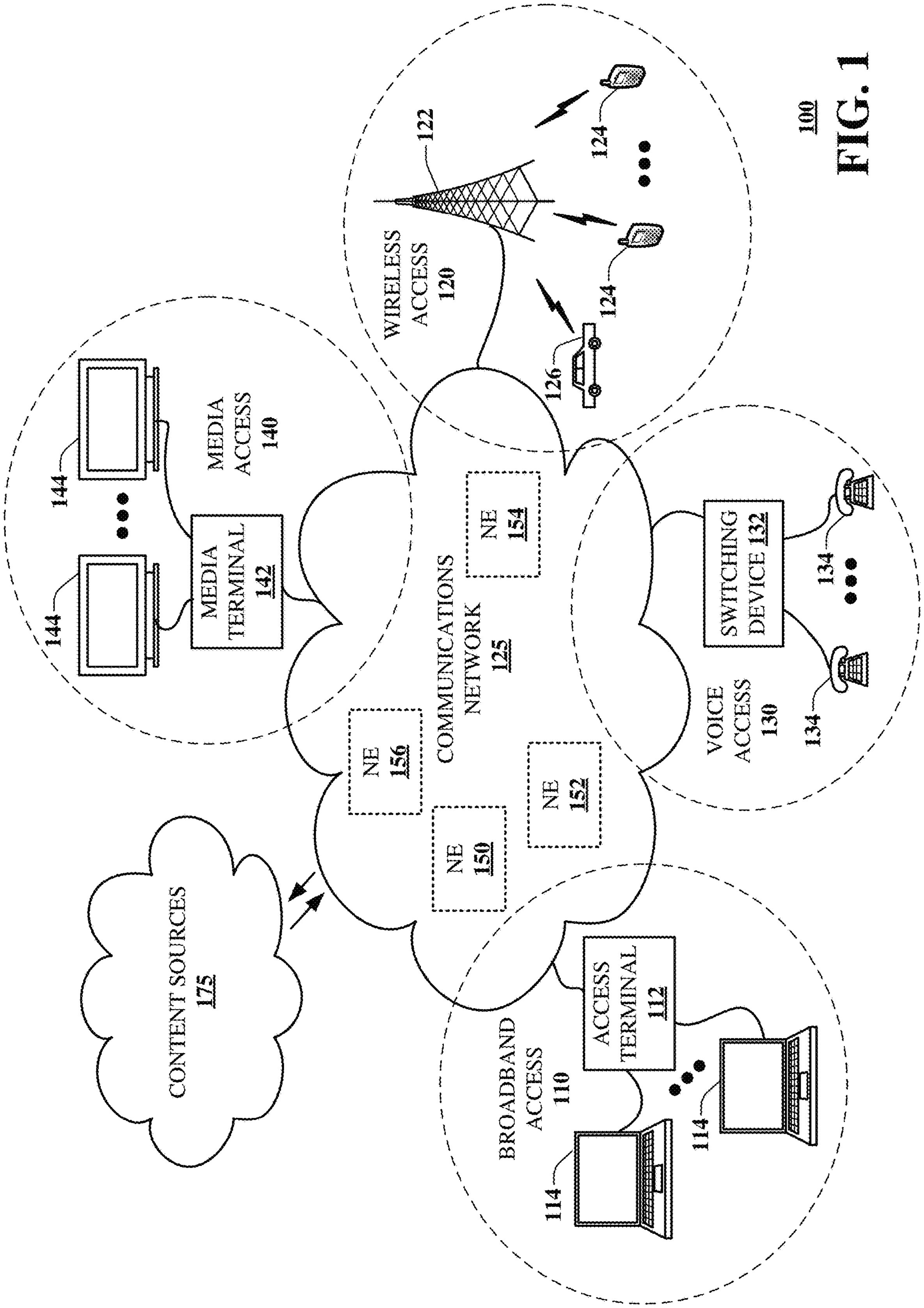
FIG. 1 is a block diagram illustrating an exemplary, non-limiting embodiment of a communications network in accordance with various aspects described herein.

One or more aspects of the subject disclosure is directed to a method including monitoring, by a processing system including a processor of a diagnostic as services (DaaS) system, a home network operation status via customer premise equipment (CPE) connected with a mobile network, wherein the customer premise equipment (CPE) operates in fixed wireless broadband services; monitoring, by the processing system, a mobility network operation and connection status via network equipment; receiving, by the processing system, a request for diagnostic of the fixed wireless broadband services; running, by the processing system, diagnostic on the home network operation status and the mobility network operation and connection status, periodically and as daily bulk data key performance indicators or as a real time customer premise equipment (CPE) check; based on the diagnostic, generating, by the processing system, a first set of recommended actions in connection with the customer premise equipment (CPE); based on the diagnostic, generating, by the processing system, a second set of recommended actions in connection with a mobility network; and outputting a diagnostic as a service recommended resolution that correlates the first set of recommended actions and the second recommended actions Referring now to FIG. 1, a block diagram is shown illustrating an example, non-limiting embodiment of a system 100 in accordance with various aspects described herein. For example, system 100 can facilitate in whole or in part systems and methods for providing diagnostic as a service (DaaS) in fixed wireless network environments. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
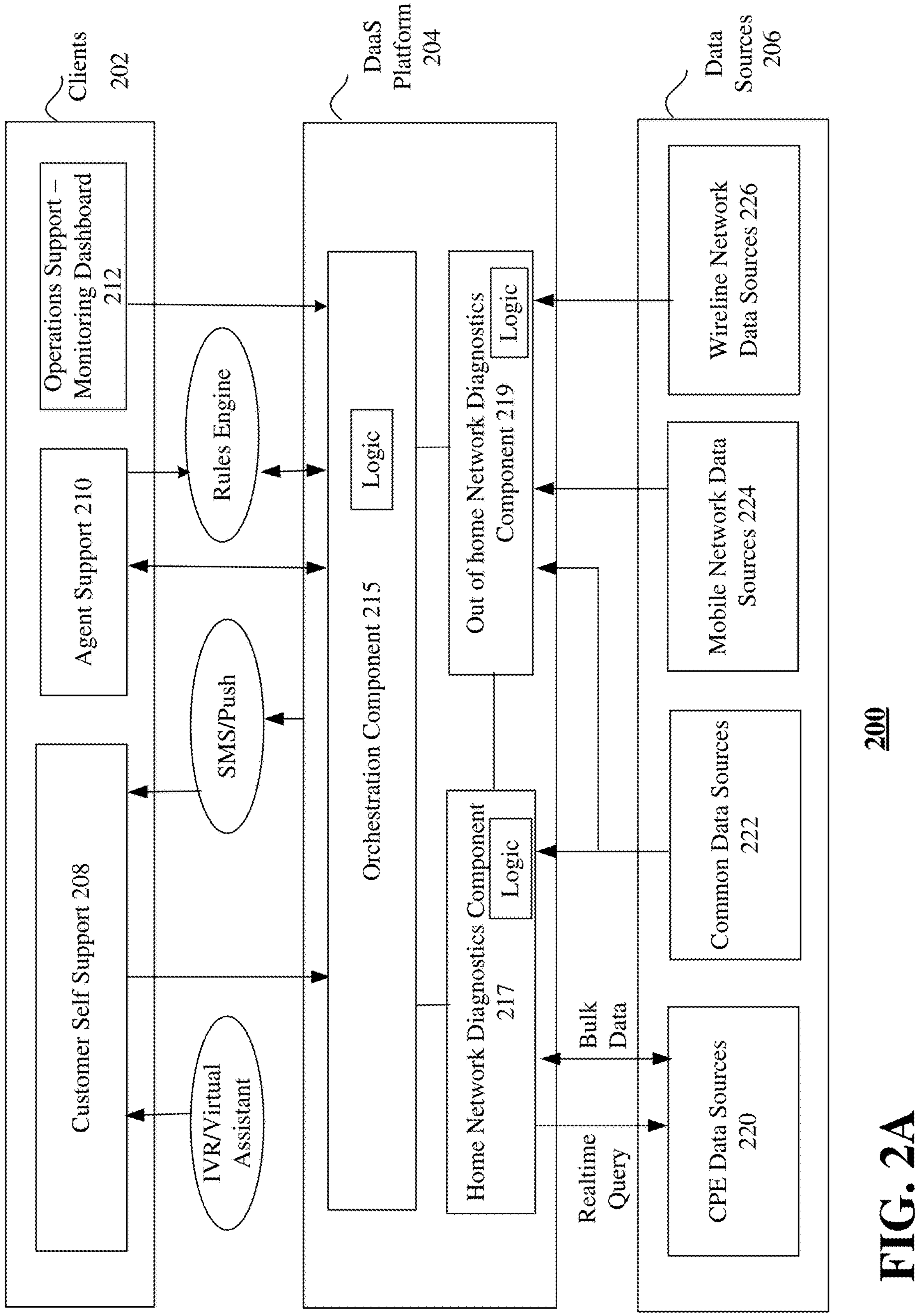
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein. The system 200 is a broadband diagnostic system including clients 202, a Diagnostic as a Service (DaaS) platform 204, and data sources 206.

In various embodiments, the clients 202 include customer self-support sources 208, agent support sources 210, and operation support sources 212. In some embodiments, the customer self-support sources 208 include customers' requests from websites, mobile webs, smart home manager applications, subscriber applications, etc. For instance, network operators of the system 100 may establish customer care channels or services to manage and monitor customers' requests, using Interactive Voice Response (IVR) or a virtual assistant, or Short Message/Messing Services (SMS) or push notifications. For instance, customers may access their respective digital accounts via websites, mobile webs, smart home manager applications, etc. Via the respective digital accounts, customers desire to know or access various diagnostic information impacting their fixed wireless network services such as a status of current outages.

In some embodiments, the agent support sources 210 may come from agents operating for retail and/or data centers. Agents may respond to customers' inquiries about a quality of services or customers' requests to take necessary actions as to poor quality of services or out of service situations. Additionally, agents may need to be informed of or alerted for known outage situations impacting customers' services. In some embodiments, the agent support sources 210 operate based on rules engines. The rules engines may include an interface and application program interfaces to the DaaS platform 204. For instance, the rules engines may enable quality check calls to be cached for short term reuses. The operations support sources 212 include monitoring dashboards that monitor various events and activities.

Figure 2B:
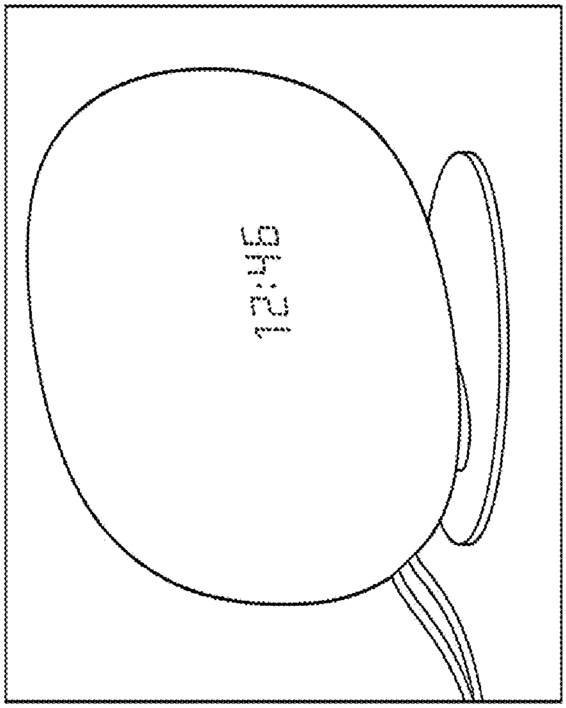
FIG. 2B depicts an illustrative embodiment of a converged gateway in accordance with various aspects described herein.

The data sources 206 include customer premise equipment (CPE) data sources 220, common data sources 222, mobile network data sources 224 and wireline network data sources 226. The CPE data sources 220 include residential gateways and extenders. FIG. 2B depicts an illustrative embodiment of a converged gateway 232 in accordance with various aspects described herein.

In some embodiments, the converged gateway 232 displays signal information via color LED and a backlit LED display. In some embodiments, the converged gateway 232 is installed to perform real time connection quality checks. Converged gateway data are in daily bulk feed and sent to the DaaS platform 204. At least some of the converged gateway data are available in response to real time queries. The converged gateway data include, by way of example, Received Signal Received Power (RSRP), Received Signal Received Quality (RSRQ), Signal-to-Interference-plus-Noise Ratio (SINR), carrier aggregation, bands (including c-band), speed test (upstream and downstream bandwidth throughput and latency), User Equipment transmit power/unlink information, rank (simultaneous streams) indicator 0-3, etc.

In other embodiments, the converged gateway 232 provide or receive network data including congestion of connected and nearby towers. The converged gateway 232 may send the network data to the DaaS platform 204 to perform tasks in order to assess service quality. As depicted in FIG. 2I, diagnostic information from the converged gateway 232 is provided to customers, agents, etc. in various forms which will be described in detail below.

In some embodiments, the converged gateway 232 operates in a fixed wireless network which includes operations of wireless devices in fixed locations such as homes and offices. The converged gateway 232 serves as a fixed wireless broadband modem that offers internet access much faster than twisted-pair hard-wired connections. Fixed wireless devices are not powered by a battery and rather powered by utility mains. The fixed wireless network is broadcast from cell towers to receivers installed by service providers of cellular services on customer's premises such as the converged gateway 232. In order to operate in the fixed wireless network, the receiver may need to reside within a certain distance from a fixed wireless internet service provider's cell tower, for example, around 10 miles.

Although the converged gateway 232 may reside within a certain distance from cell towers, the DaaS platform 204 is not subject to the same distance limit and can be distributed across the network or operate in a cloud environment. In some embodiments, the DaaS platform 204 includes a home network diagnostic component 217 and an out of home network diagnostic component 219. The out of home network diagnostic component 219 may reside in a data center or the cloud environment. The home network diagnostic component 217 is also not limited to a particular location relative to cell towers and/or can be loaded into the cloud environment.

Referring back to FIG. 2A, in some embodiments, the common data sources 222 include customer care and dispatch data, order graphs, customer graphs, customer relationship management (CRM) solutions, etc. The mobile network data sources 224 include data relating to residential gateway speed tests, radio base stations in 4G/5G networks, etc. The wireline network data sources 226 includes Global Fault Platform (GFP) alarms, wireline access network data, etc.

As depicted in FIG. 2A, the DaaS platform 204 receives requests and queries from the clients 202 and utilizes data from the data sources 206 based on the requests and queries. The DaaS platform 204 provides a response including diagnostic as service to the clients 202. In various embodiments, the DaaS platform 204 operates as a centralized orchestration platform that enables common diagnostic and actions across customer services and care channels, including agents, customers, technicians and/or IVR. In some embodiments, the DaaS platform 204 is configured to be a microservices application program interface (API) layer which manages orchestration and correlates customer premise equipment (CPE) and network diagnostic recommendations. The DaaS platform 204 provides diagnostic recommendation and actions based on thresholds, consuming channels, etc.

In various embodiments, the DaaS platform 204 facilitates and supports the following use cases by receiving and responding to requests from customers and agents:

- Customers request information for a current signal quality of wireless broadband services by using websites, mobile webs, smart home manager applications, etc.
- Customers request a status of known outages impacting services by accessing their digital accounts.
- Customers request remotely rebooting a wireless broadband residential gateway via their digital accounts.
- Agents or representative at retail and data centers request to have access to a current signal quality and an indication of when a signal quality becomes below optimal or normal quality.
- Agents or representative at retail and data centers request to be automatically alerted to known outages impacting customers' services by accessing customers' digital accounts.
- Agents or representative request remotely rebooting a wireless broadband residential gateway upon direction by troubleshooting processes.

Referring to FIGS. 2C through 2G, each use case is described in detail as set forth below.

In some embodiments, the DaaS platform 204 includes an orchestration component 215, the home network diagnostic component 217 and the out of home network diagnostic component 219. In other embodiments, the orchestration component 215, the home network diagnostic component 217 and the out of home network diagnostic component 219 may be integrated into a single component or two components as needed. In some embodiments, the home network diagnostic component 217 and the out of home network diagnostic component 219 may be configured to manage and handle a specific type or specific content of data. For instance, the home network diagnostic component 217 is a diagnostic component that manages the CPE and home network data. The out of home network diagnostic component 219 manages out of home network diagnostic.

In some embodiments, the orchestration component 215 interfaces with the clients 202 and receives requests from the clients 202. The orchestration component 215 includes logics that obtain necessary data from the home network diagnostic component 217 and the out of home network diagnostic component 219. The logics of the orchestration component 215 are further configured to determine recommended actions for the CPE and the communication networks including mobile networks and the wireline networks. In some embodiments, the recommended actions can be proactive actions, or reactive actions, or both.

In some embodiments, the home network diagnostic component 217 includes logics that communicate with CPEs, checks a status and determines or detects an abnormal status or an out of service status. As described above, the converged gateway 232 performs real time connection quality checks. Converged gateway data are configured to be in daily bulk feed and sent to the home network diagnostic component 217. At least some of the converged gateway data are available in response to real time queries, as depicted in FIG. 2A. The converged gateway 232 provides or receives network data including congestion of connected and nearby towers. The converged gateway 232 may send the network data to the DaaS platform 204 to perform tasks in order to assess service quality.

Additionally, or alternatively, the out of home network diagnostic component 219 includes logics that communicate with the mobility network such as cell towers, checks a status and determines or detects an abnormal status or an out of service status. The home network diagnostic component 217 and the out of home network diagnostic component 219 may not be limited and are configured to supplement respective operations and functions depending on a status of out of home network or home network. For instance, if one of the components 217 and 219 may not properly work, a customer is out of service, etc., such information is stored, the orchestration component 215 operates accordingly. When a customer is out of service, the orchestration component 215 uses the stored information and responds accordingly to a northbound system when diagnostic are asked. One of the components 217 and 219 may access CPE data or network data as needed in order to run diagnostic per a customer's request.

In some embodiments, the logics used in the DaaS platform 204 includes a processing system including a processor and a memory that stores executable instructions that, when executed by the processing system, facilitate performance of operations. Additionally, the logics can be trained by using machine learning techniques.

In some embodiments, the DaaS platform 204 is a rules based configurable system that can be continuously improved upon. The DaaS platform 204 utilizes static and dynamic (e.g., machine learning) capabilities to diagnose and recommend solutions to wireless broadband customers using the converged Gateway 232.

In some embodiments, the DaaS platform 204 provides omnichannel orchestration for diagnostic, problems resolution, and enhanced proactive care capabilities, used by web, native mobile, cloud services, and AI driven Contact Center as a Service (CCAI) as well as IVR and Field Services. FIG. 2A depicts various components and diagnostic flows from the DaaS platform 204 for internet service subscribers and the converged gateway 232. In some embodiments, the clients 202 consume DaaS diagnostic and actions and can request diagnostic and next best actions from the DaaS platform 204 in order to resolve issues such as customers broadband issues. The data sources 206 include key performance indicators and network and in-home data that are obtained by the DaaS platform 204. The DaaS platform 204 uses the obtained data to complete the diagnostic. In some embodiments, data is fed into the DaaS platform 204 real time as well as continuously in order to help diagnose the customers problems. There are specific flows and data inputs for fixed wireless broadband diagnostic. FIG. 2I provides an exemplary illustration of the DaaS recommended resolution and the range of diagnostic information covered by the DaaS platform 204.

The DaaS platform 204 may achieve a quicker resolution of customers problems and resolution. Consistent and accurate diagnostic and resolutions can be performed, regardless of customer care channels the customer uses. Customers are able to switch between customer care channels without loss of previous diagnostic and resolution steps taken without starting over repeatedly due to the care channel switching. In some embodiments, the DaaS platform 204 enables use of machine learning for improved diagnostic. Additionally, the DaaS platform 204 may eliminate multiple systems requesting customers care data for different customers care channel use. The DaaS platform 204 is a configurable system for quicker updates from businesses' needs. Furthermore, fixed wireless service diagnostic and recommended resolutions provided by the DaaS platform 204 can be used and available separately or in combination with fixed wireless services.

In some embodiments, machine learning techniques can be used in running diagnostic, making CPE proactive recommended actions, CPE reactive recommended actions, network reactive recommended actions and network proactive recommended actions, and making other determinations relating to data needed, checking data with different diagnostic components, etc. Alternatively, all diagnostic and actions or static analytics may be used, instead of machine learning techniques, if and when some of the input data is unreliable.

Figure 2C:
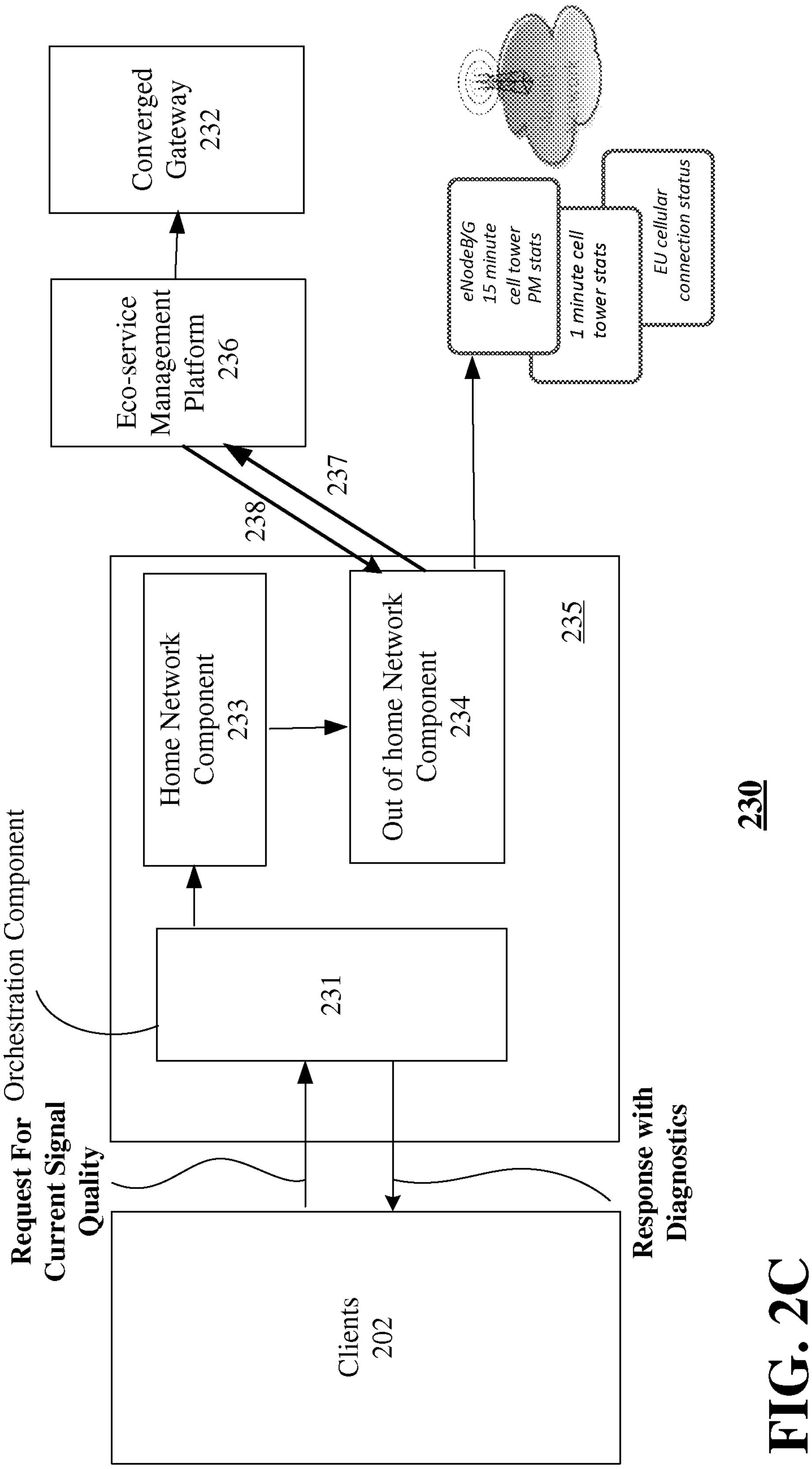
FIG. 2C is a block diagram illustrating an example, non-limiting embodiment of a first variant system in accordance with various aspects described herein.

FIG. 2C is a block diagram illustrating an example, non-limiting first variant of a DaaS system in accordance with various aspects described herein. A DaaS system 230 includes clients 202, a DaaS platform 235, and a converged gateway connection 235. The DaaS platform 235 includes an orchestration component 231, a home network component 233 and an out of home network component 234. The DaaS platform 235 facilitates a use case for receiving a request from an agent or a representative at retail and data centers with respect to a current signal quality and an indication of the current signal quality being below optimal or below normal quality. Additionally, the DaaS platform 235 further facilitates the request for the current signal quality when sent from a customer for wireless broadband services. As depicted in FIG. 2I, the current signal quality may include a 5G signal quality, a WiFi signal quality, etc.

The home network component 233 is configured to go through a mobility broadband tools system and pull for information associated with the service quality. The information associated with the service quality includes configurable service quality thresholds. The home network component 233 can configure the service quality thresholds. By way of example only, the configurable service quality thresholds include a green threshold, a yellow threshold, and a red threshold. For instance, the green threshold corresponds to receiving a data rate of 25M bps, a good signal quality, and a good cell tower which does not experience congestion. The yellow threshold corresponds to receiving a data rate between 5 M bps and 25M bps and bad signal quality and/or bad cell tower which experience congestion. The red threshold corresponds to receiving a data rate of 5M bps or less and bad signal quality and/or bad cell tower which experience congestion. By way of another example, the thresholds can be used to avoid a connection to a cell tower that is experiencing congestion. As depicted in FIG. 2I, DaaS recommended resolution can flag congested channels on a user interface.

In some embodiments, the home network component 233 includes an activity logger that logs and records activities, independently of diagnostic. Thus, the DaaS platform 235 can record, store and keep track of activities that have been completed thereon. For instance, a customer starts with a self-care activity, i.e., requesting for diagnostic information or inquiring about a current signal quality and then decides to obtain help from an agent. Such event is recorded in the activity logger and the customer or the agent does not need to start over the entire process. As a result, FIG. 2I depicts an event history with corresponding values and timestamps.

The out of home network component 234 is communicatively connected with the home network component 233 and the converged gateway 232. The home network component 233 requests the out of home network component 234 to check wireless service quality including a speed test, signal quality, cell tower congestion, etc. The out of home network component 234 communicates with the converged gateway 232 (depicted in FIG. 2A) via an eco-service management platform 236. The eco-service management platform 236 supports integrated applications which give service providers the visibility into a home network and the ability to automate and control subscriber devices and experiences. The eco-service management platform 236 is utilized to manage residential gateways for broadband services, including the converged gateway 232. The out of home network component 234 requests and receives signal data from the converged gateway 232 and a speed test result from the residential gateway such as the converged gateway 232 as shown with the arrow 237 in FIG. 2C.

By way of example, the converged gateway 232 sends data to the out of home network component 234 via the eco-service management platform 236 on a regular basis such as every fifteen minutes. The out of home network component 234 keeps track of key performance indicators of the converged gateway 232. The out of home network component 234 stores signal quality information from the real time queries plus daily bulk data of the converged gateway 232. The out of home network component 234 runs service quality algorithm. Additionally, the out of home network component 234 obtains network data from one or more base stations (eNodeB/gNodeB depending on 4G, 5G, or higher standards) regularly such as every fifteen minute. For instance, the out of home network component 234 obtains data regarding a cell tower performance statistics from one or more cell towers, cell tower health data of the one or more cell towers, on a regular frequency (e.g., every one minute). The out of home network component 234 further obtains EU cellular connection status. The out of home network component 234 can obtain performance statistics from cell towers.

During installation, the home network component 233 saves pre-qualification data and the results of each placement step, as well as an installation method used for each placement, for later troubleshooting. Detailed history of the installation can be kept in the out of home network component 234.

The orchestration component 231 coordinates the operations of the home network component 233 and the out of home network component 234 to obtain signal data of residential gateways and mobility network data in order to respond to the request for the clients 202. The orchestration component 232 further controls the home network component 233 and the out of home network component 234 to check wireless service quality such as speed test, signal quality, tower congestion etc. and stores signal quality from real time queries and daily bulk data based on the network data. As a result, the orchestration component 231 provides to the clients 202 a response for the current signal quality and the requested indicator after running diagnostic as to the current signal quality. Moreover, a signal quality history for the converged gateway 232 can be stored and associated with a customer's account for use in future diagnostic and troubleshooting work.

Figure 2D:
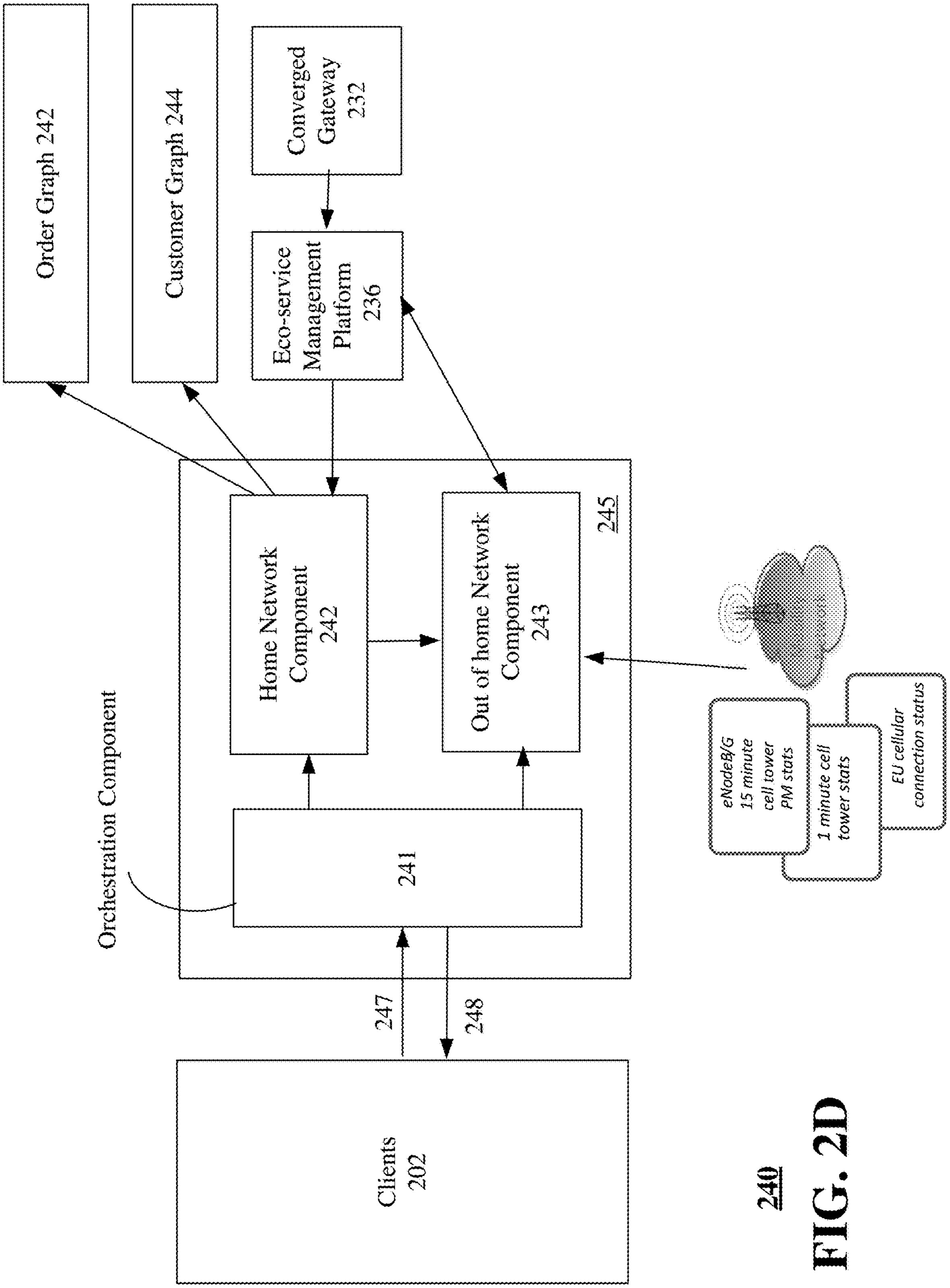
FIG. 2D is a block diagram illustrating an example, non-limiting embodiment of a second variant system in accordance with various aspects described herein.

FIG. 2D is a block diagram illustrating an example, non-limiting second variant of a DaaS system in accordance with various aspects described herein. A DaaS system 240 includes clients 202 and a DaaS platform 245. The DaaS platform 245 includes an orchestration component 241, a home network component 233 and an out of home network component 243. The DaaS platform 245 facilitates a use case where a request from an agent or a representative at retail and data centers, or a request from a customer is received for running diagnostic and inquiring about known outages (depicted "247"). The DaaS platform 245 provides a response 248 to the request from an agent or a customer including notifying or informing of known outages.

The orchestration component 241 communicates with the home network component 242 and the out of home network component 243 simultaneously or contemporaneously. As described above in connection with FIG. 2C, the home component 242 obtains data from the converged gateway 232 via an eco-service management platform 243 in order to run diagnostic of home networks. For instance, every 3 minutes, the converged gateway 232 sends to the home network component 242 notifications that a communication status remains active and connected via the eco-service management platform 236. By way of example, the notification can have a format of HTTP bulk data heartbeat. If the home network component 242 misses a heartbeat, the home network component 242 can go and execute logics indicating that a customer may have an out-of-service situation in 20-30 minutes. The executed logics by the home network component 242 may further indicate, waiting and verifying the out-of-service status, instead of immediately notifying the customer, in order to avoid incorrect notifications. The home network component 242 obtains network data from the mobility network to run diagnostic of the mobility network. The operations for obtaining the data from the converged gateway 232 and obtaining the network data from the mobility network, described above in connection with FIG. 2C, can be applied to the operations of the home network component 242 and the out of home network component 243.

The home network component 242 obtains order data from an order graph 242 and product and service data from a customer graph 244. The order graph 242 and the customer graph 244 are included in the common data source 222 as depicted in FIG. 2A. In the DaaS system 240, the home network component 242 and the out of home network component 243 can collect performance data from the converged gateway 232 via the eco-service management platform 236. For instance, the out of home network component 243 can obtain 15 minute and daily bulk data key performance indicators and run a real time parameter check on the converged gateway 232.

The orchestration component 241 is configured to check a service health status via the out of home network component 243 and obtain network performance data. The orchestration component 241 is further configured to obtain data for home network diagnostic via the home network component 242. The orchestration component 241 provides home diagnostic information to the clients 202. The orchestration component 241 notifies the clients 202 of known outages impacting a customer's service. An agent or representative can be automatically alerted for the known outages. Customers may be able to access the known outages when they access digital accounts. For instance, if the Home network component 242 misses a heartbeat from the converged gateway 232, the Home network component 242 can go and execute logics indicating that a customer may have an out-of-service situation shortly. The executed logics by the Home network component 242 may further indicate, waiting and verifying the out-of-service status, instead of immediately notifying the customer, in order to avoid incorrect notifications. If the home network component 242 detects known outages, such information is provided to the orchestration component 241 which in turn provides such information to the clients 242.

Figure 2E:
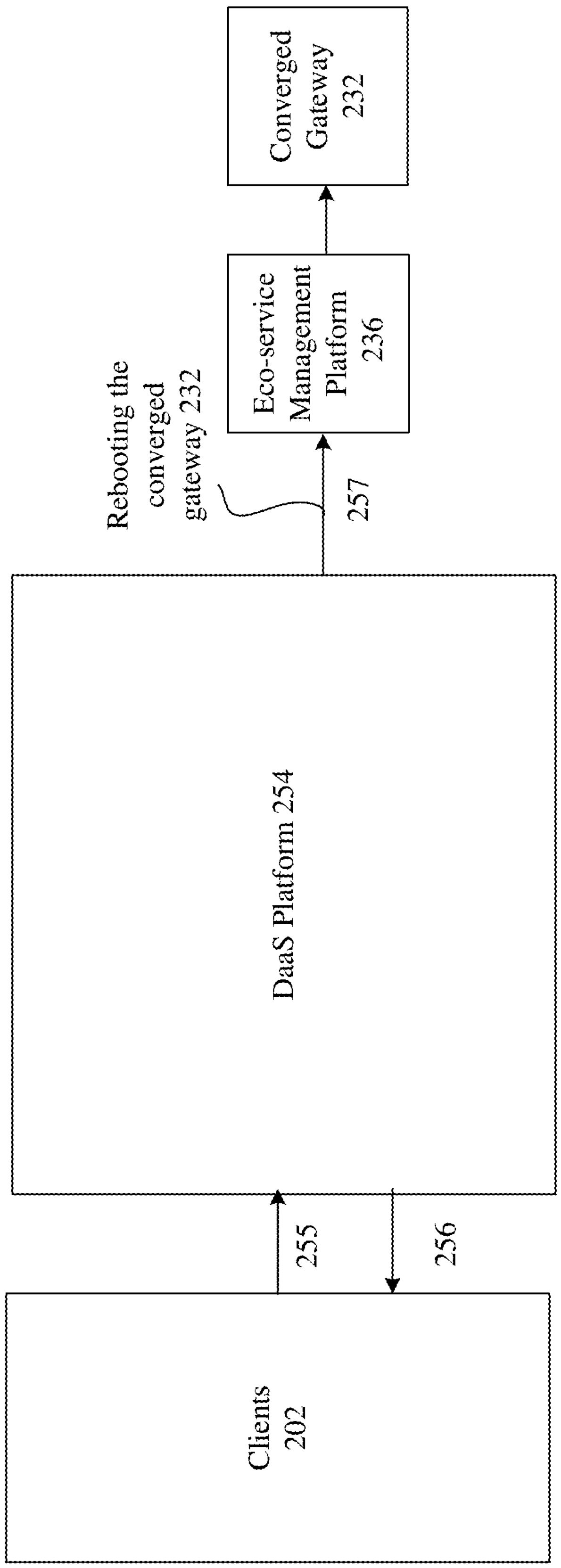
FIG. 2E is a block diagram illustrating an example, non-limiting embodiment of a third variant system in accordance with various aspects described herein.

FIG. 2E is a block diagram illustrating an example, non-limiting third variant of a DaaS system in accordance with various aspects described herein. A DaaS system 250 includes a DaaS platform 254 in communication with the converged gateway 232 via the eco-service management platform 236. The DaaS platform 254 facilitates a use case enabling a remote reboot request by an agent or a representative at retail and data centers, or a request from a customer. The clients 202 send a request for diagnostic data or information to the DaaS platform 254. The DaaS platform 254 is configured to run diagnostic based on a request (255) from the clients 202. Upon determination that the DaaS platform 254 has detected abnormal heartbeats from the converged gateway 232, the DaaS platform 254 responds to the request from the clients 202. The clients 202 determines whether rebooting the converged gateway 232 is needed or not. The clients 202 may request remote rebooting via the DaaS platform 254 which is communicatively coupled to the converged gateway 232. In some embodiments, the clients 202 may access their digital accounts which send their requests to remotely reboot the converged gateway 232. Additionally, or alternatively, an agent or a representative may also make the same request of remotely rebooting the converged gateway 232 when directed by troubleshooting processes.

Figure 2F:
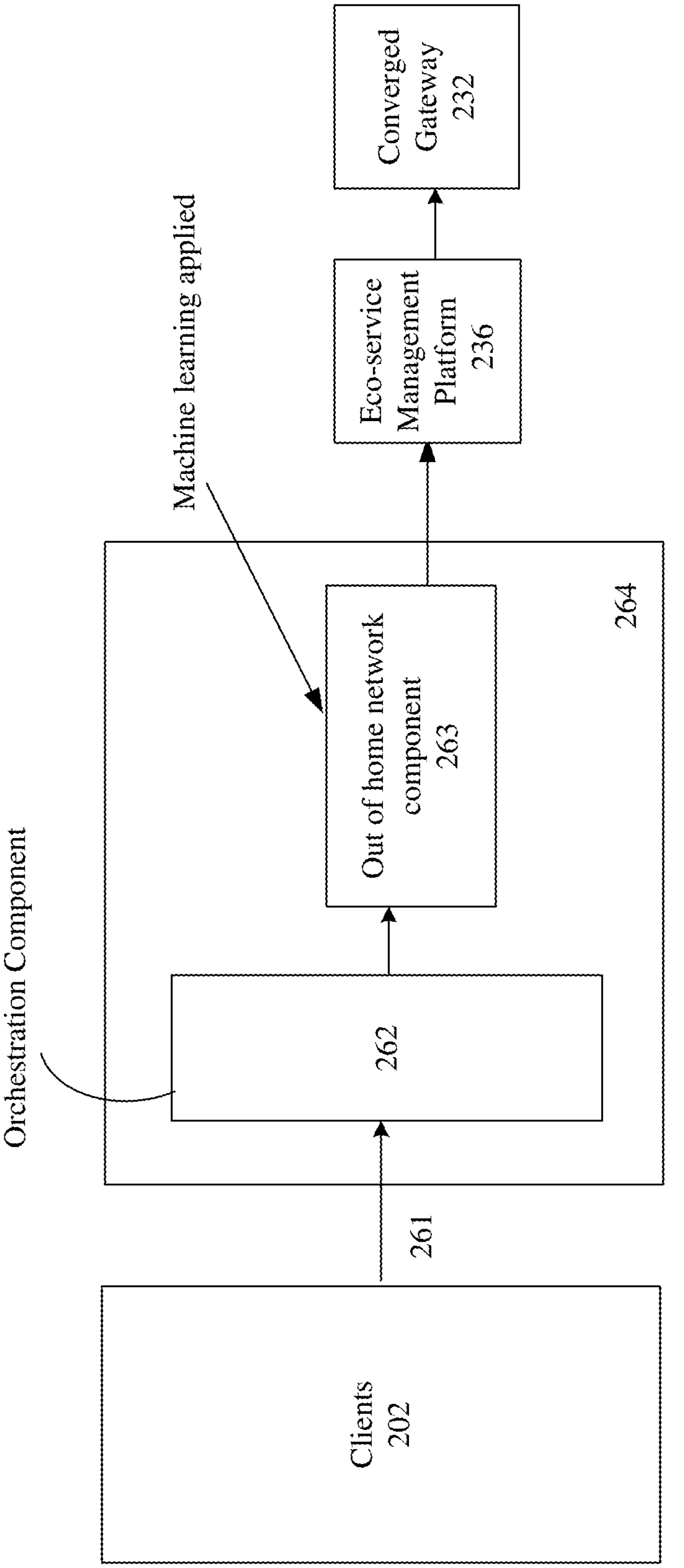
FIG. 2F is a block diagram illustrating an example, non-limiting embodiment of a fourth variant system in accordance with various aspects described herein.

FIG. 2F is a block diagram illustrating an example, non-limiting fourth variant of a DaaS system 260 in accordance with various aspects described herein. The DaaS system 260 includes a DaaS platform 264 including an out of home network component 263. The DaaS system 264 facilitates a use case where operations of the ability to retrieve location information are requested. The orchestration component 262 receives a request (261) for running diagnostic from an agent or a representative at retail and data centers, or a request from a customer. While running diagnostic, the orchestration component 262 is configured to request a location of GPS. As a fixed wireless broadband device does not have GPS functions, the orchestration component 262 determines to use an out of home network component 263 based on geotagging capabilities and expose a subscriber service address. In some embodiments, the out of home network component 263 utilizes machine learning and geotagging capabilities. Based on information available as to the subscriber, a location of the subscriber may be determined.

Figure 2G:
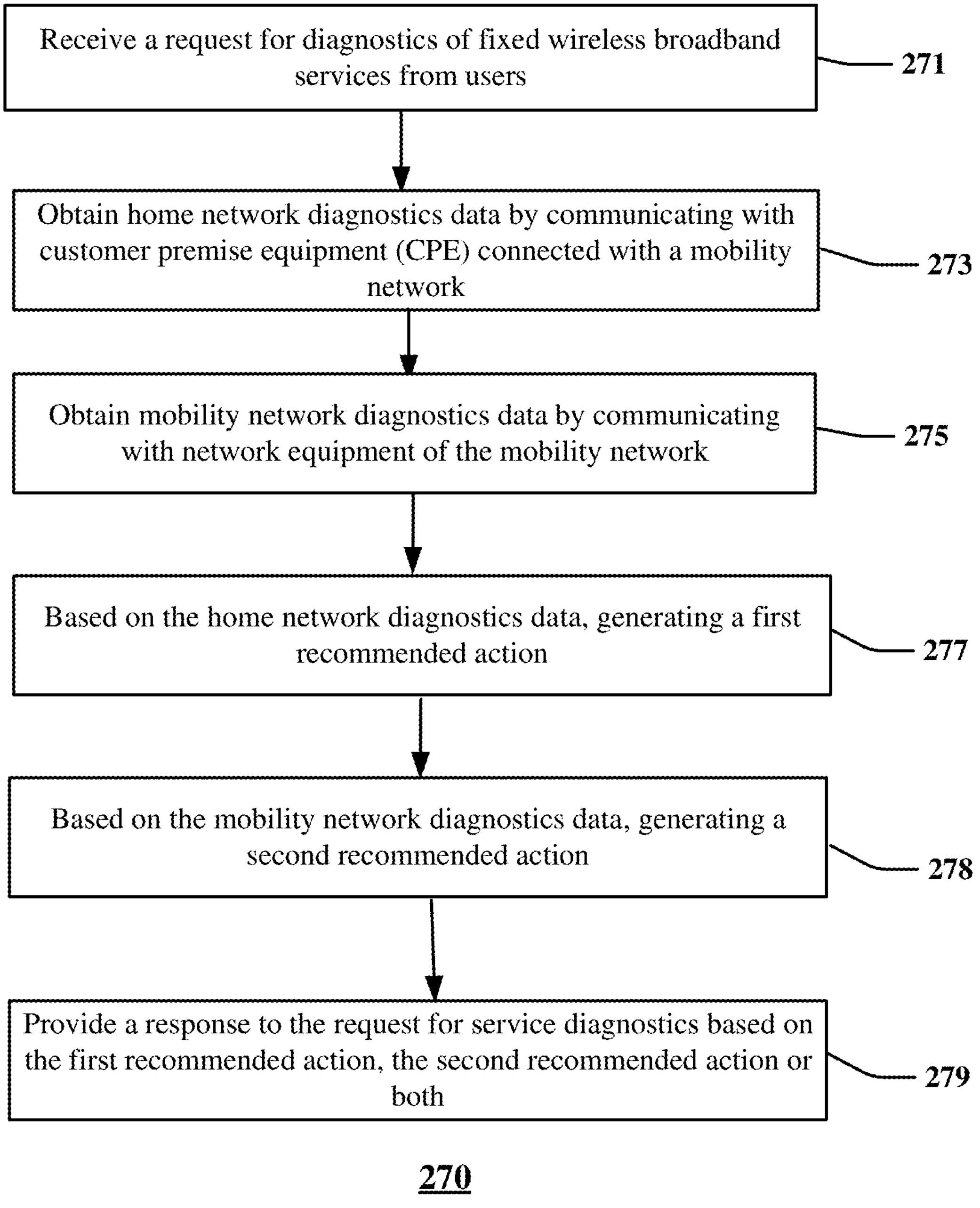
FIG. 2G depicts an illustrative embodiment of a method in accordance with various aspects described herein.

FIG. 2G depicts an illustrative embodiment of a method in accordance with various aspects described herein. A method 270 includes receiving a request for diagnostic of fixed wireless broadband services from users (Step 271). The request for diagnostic of fixed wireless broadband services further includes a request for service quality from the users of the fixed wireless broadband services indicative of uplink speed and downlink speed, a signal quality, tower congestion, or a combination thereof.

The method 270 includes obtaining home network diagnostic data by communicating with customer premise equipment (CPE) connected with a mobility network (Step 273) and obtaining mobility network diagnostic data by communicating with network equipment of the mobility network (Step 275). The obtaining the home network diagnostic data further includes obtaining the home network diagnostic data periodically and as daily bulk data key performance indicators. In some embodiments, the obtaining the home network diagnostic data further includes receive a series of data signals indicative of an operation status of the customer premise equipment (CPE) in a fixed wireless broadband network. The obtaining the home network diagnostic data further includes obtaining a series of HTTP bulk data heartbeats from the customer premise equipment (CPE). The customer premise equipment (CPE) further includes one or more residential gateways. The obtaining mobility network diagnostic data further includes receiving performance statistics of the network equipment including one or more cell towers and a cellular connections status.

The method 270 further includes, based on the home network diagnostic data, generating a first recommended action (Step 277) and based on the mobility network diagnostic data, generating a second recommended action (Step 278). In some embodiments, the generating the first recommended action further includes enabling the users of the fixed wireless broadband services to remotely reboot the customer premise equipment (CPE). The generating the second recommended action further includes requesting and retrieving a current GPS location of a user's mobile equipment from the mobility network. The method 270 includes providing a response to the request for service diagnostic based on the first recommended action, the second recommended action or both (Step 279).

In some embodiments, the method 270 further includes storing one or more configurable service quality thresholds, executing a service quality algorithm, and storing a signal quality received from the CPE and the network equipment.

Figure 2H:
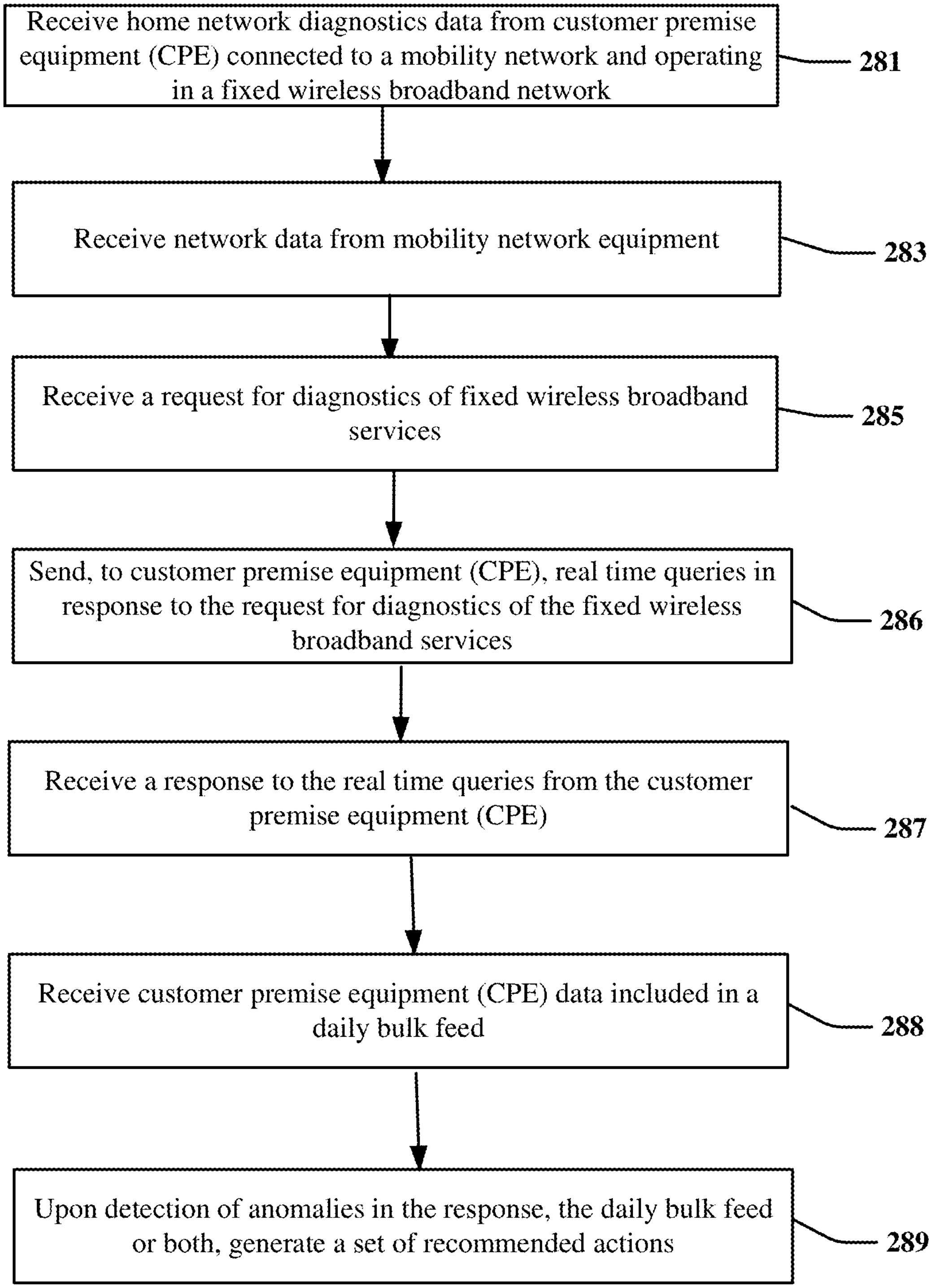
FIG. 2H depicts an illustrative embodiment of another method in accordance with various aspects described herein.
Figure 2I:
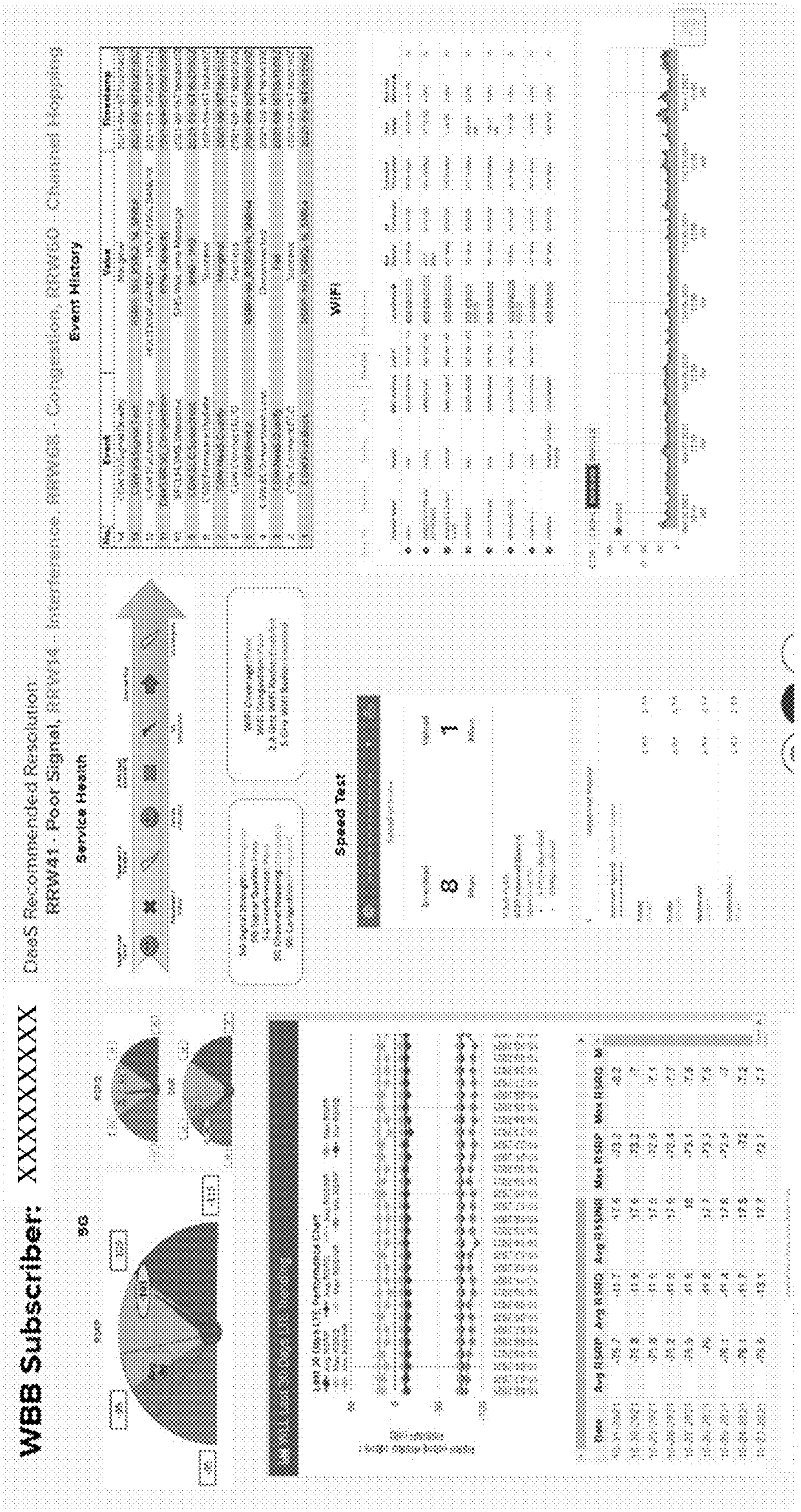
FIG. 2I depicts an illustrative embodiment of diagnostic as service recommended resolution on a user interface.

FIG. 2H depicts an illustrative embodiment of another method in accordance with various aspects described herein. A method 280 includes receiving home network diagnostic data from customer premise equipment (CPE) connected to a mobility network and operating in a fixed wireless broadband network (Step 281). For instance, the receiving the home network diagnostic data further includes receiving a series of HTTP bulk data heartbeats. The method 280 further includes receiving network data from mobility network equipment (Step 283). The method 280 includes receiving a request for diagnostic of fixed wireless broadband services (Step 285). The method 280 further includes sending, to customer premise equipment (CPE), real time queries in response to the request for diagnostic of the fixed wireless broadband services (Step 286) and receiving a response to the real time queries from the customer premise equipment (CPE) (Step 287).

The method 280 includes receiving customer premise equipment (CPE) data included in a daily bulk feed (Step 288) and upon detection of anomalies in the response, the daily bulk feed or both, generating a set of recommended actions (Step 289). The generating the set of recommended actions further includes enabling the users of fixed wireless broadband services to remotely reboot the customer premise equipment (CPE). The generating the set of recommended actions further includes notifying the users of fixed wireless broadband services of known outages. The method 280 also generating a microservice application interface layer that correlates the set of recommended actions for the customer premise equipment (CPE) and for the mobility network.

While for purposes of simplicity of explanation, the respective processes are shown and described as a series of blocks in FIGS. 2G and 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2I depicts an illustrative embodiment of diagnostic as service (DaaS) recommended resolution on a user interface. The DaaS recommended resolution depicted in FIG. 2I is by way of example only and the present disclosure is not limited thereto. The DaaS recommended resolution shows a particular wireless broadband subscriber identification associated with diagnostic information displayed on the user interface. The DaaS recommended resolution indicates a service health indicator, for example, showing 5G Signal Strength: Marginal, 5G Signal Quality: Pass, 5G Interference: Pass, 5G Channel Hopping: Frequent, 5G Congestion: Frequent, and WiFi Coverage: Pass, WiFi Congestion: Pass, 2.4 GHz WiFi Radio: Enabled and 5 GHz WiFi Radio: Enabled. The DaaS recommended resolution shows a speed test for Download and Upload speed along with internet plan information and speed test history.

The DaaS recommended resolution further provides an event history including converged gateway 5G signal quality, converged gateway 5G signal test, Speedtest, Firmware Update, converged gateway booting, converged gateway heartbeat lost, etc. along with timestamps and relevant values (marginal for the signal quality, 87% capacity for the congestion, success for the firmware update, success for connection requests, disconnected for the heartbeat lost, etc.). The DaaS recommended resolution also indicates detailed information relating to WiFi and last 30 days trending of LTE performance and corresponding charts which show average RSRP, average RSRQ, average RSSINR, Max RSRP, Max RSRQ, etc.

In various embodiments, information displayed and presented on the user interface can be configurable and customizable based on requests or needs by users or customers as well as service providers. As depicted in FIG. 2I, the diagnostic information associated with a particular wireless broadband user keeps track of the event history and presents relevant diagnostic information at one glance. Accordingly, when users or agents access their digital accounts, various types of diagnostic information can be readily available at one glance. For instance, when a user's converged gateway is out of service, upload or download experience unusually slow speed, and/or outage is happening, users or agents can grasp such status in itemized views and as an overall summary indicator such as service health with relevant icons.

Based on the above, the DaaS platform can provide diagnostic of the customer premise equipment (CPE) and the mobility network in a consolidated manner with respect to the current service health status and events history. Moreover, the DaaS platform provides detailed diagnostic information of the customer premise equipment (CPE) and the mobility network such that users or agents can appreciate and understand the nature and the extent of the service status. The DaaS platform also provides recommended actions in response to the current service status based on the diagnostic information and facilitates execution of the recommended actions such as remotely rebooting the converged gateway if needed and requested by users.

Figure 3:
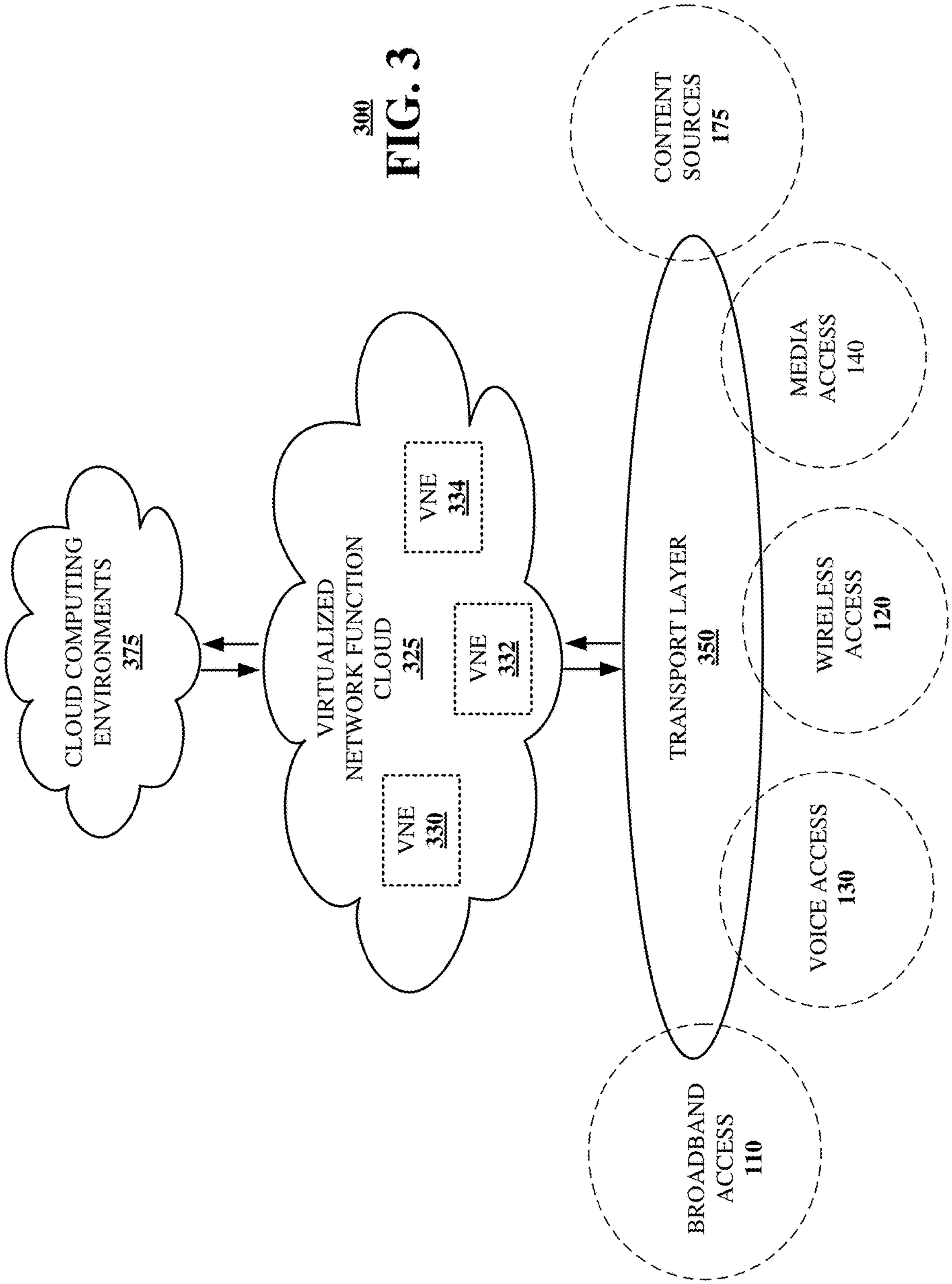
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part systems and methods for providing diagnostic as a service (DaaS) in fixed wireless network environments.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
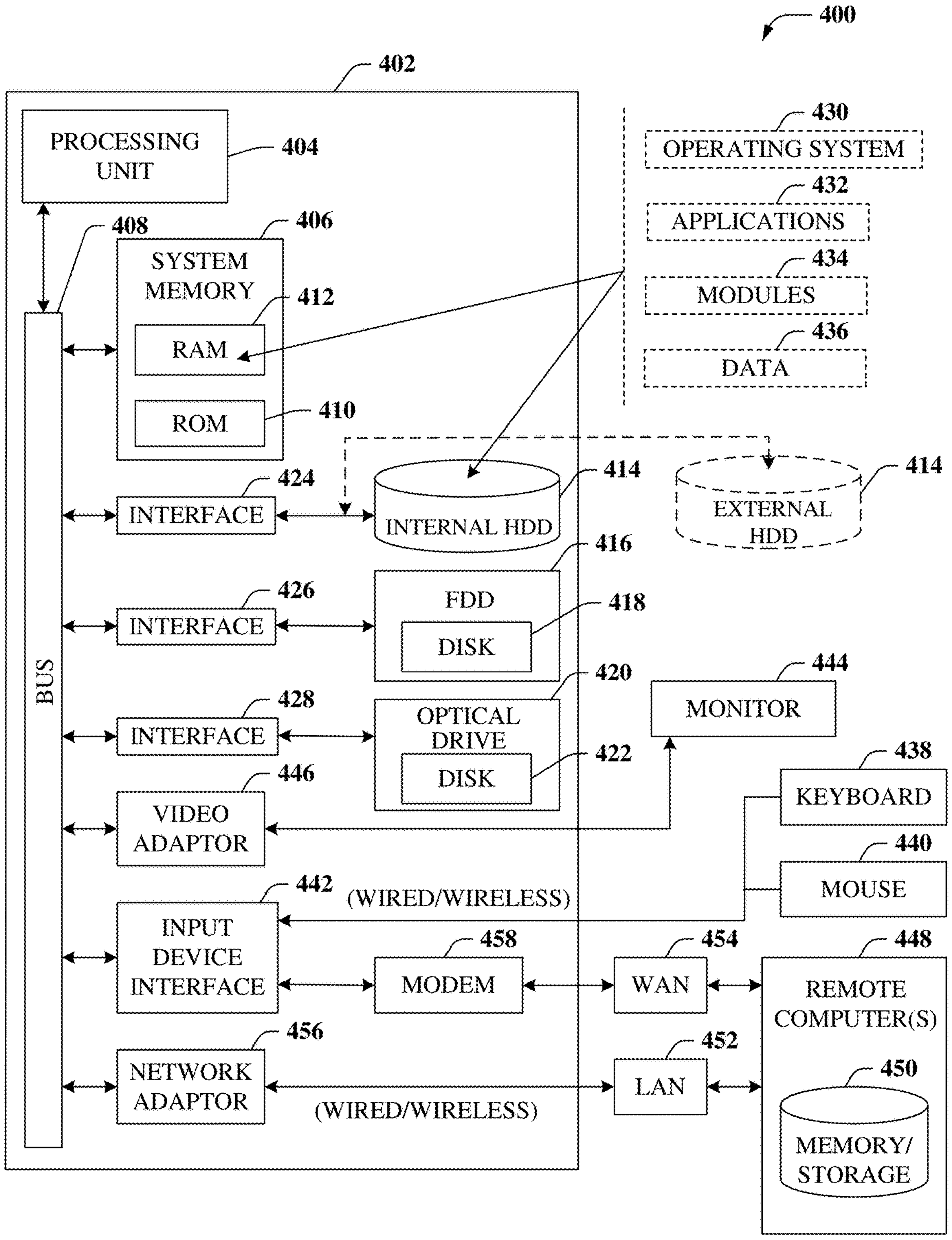
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in systems and methods for providing diagnostic as a service (DaaS) in fixed wireless network environments.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
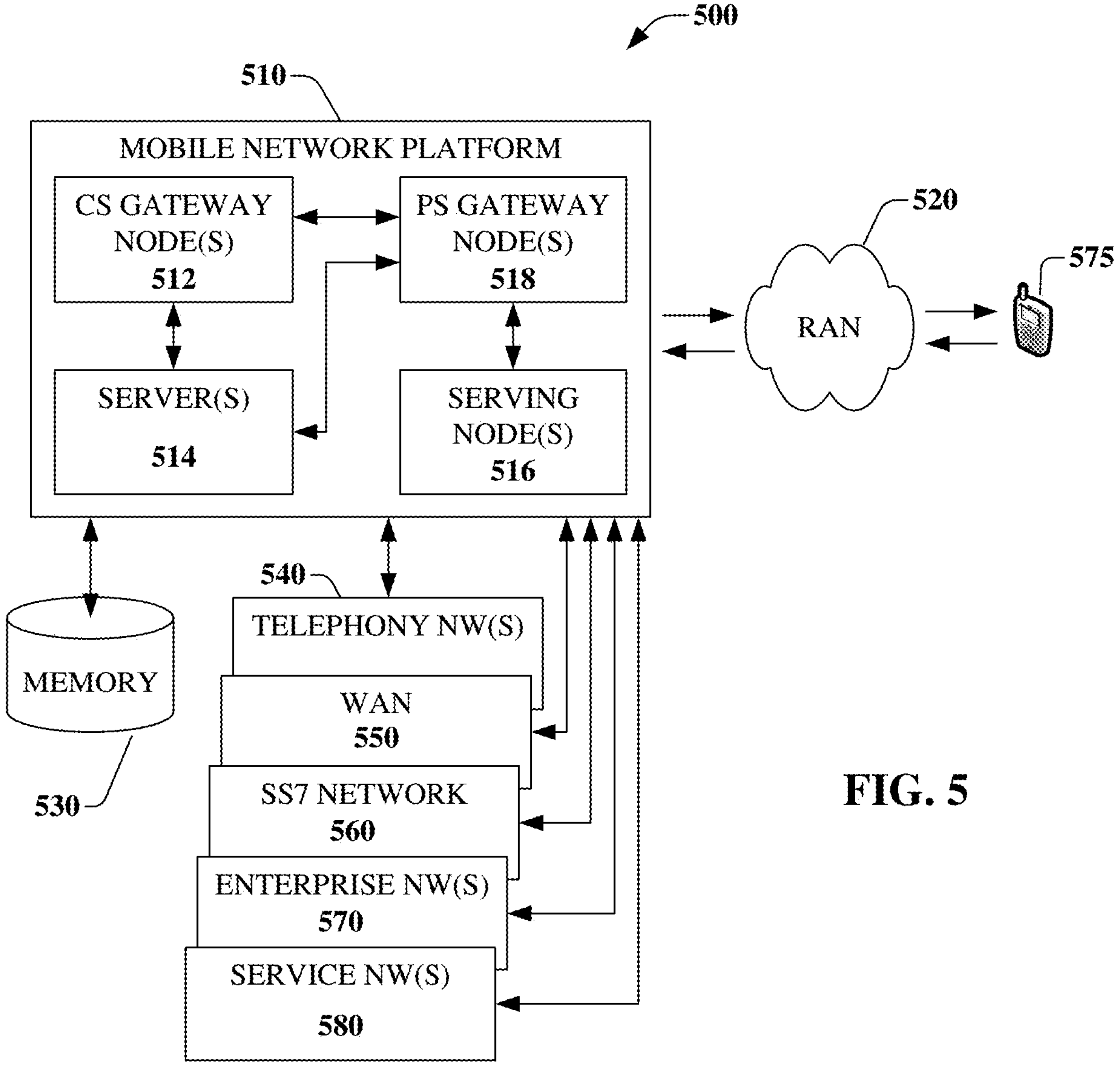
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part systems and methods for providing diagnostic as a service (DaaS) in fixed wireless network environments. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
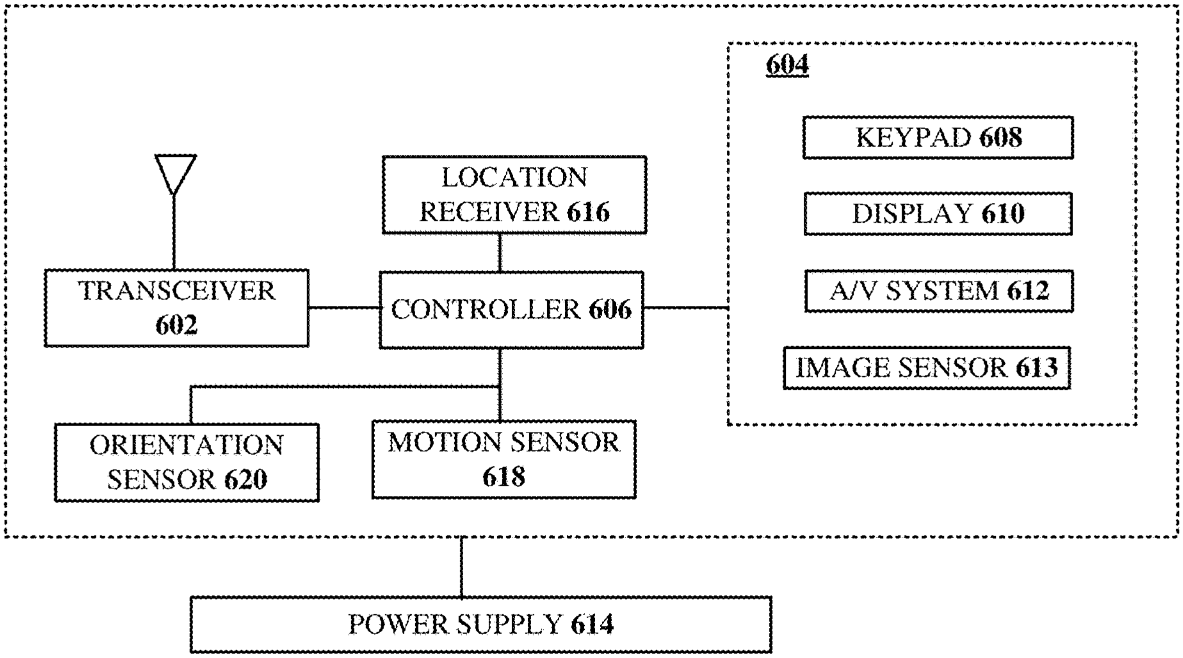
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part systems and methods for providing diagnostic as a service (DaaS) in fixed wireless network environments.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system of a diagnostic as services (DaaS) platform, the processing system including a processor; and a memory that stores executable instructions that, when executed by the processing system, facilitate performance of operations, the operations comprising:

receiving a request for diagnostic of fixed wireless broadband services from a users;

sending, to customer premise equipment (CPE) connected with a mobility network and operating as a fixed wireless broadband gateway, one or more real-time queries responsive to the request;

obtaining home network diagnostic data from the CPE, wherein the home network diagnostic data comprises a response to the one or more real-time queries and a daily bulk feed of CPE data including a series of bulk data heartbeats;

obtaining mobility network diagnostic data by communicating with network equipment of the mobility network, wherein the mobility network diagnostic data comprises a connection status of the CPE with one or more cell towers of the mobility network and congestion information for the one or more cell towers;

executing a service quality algorithm using one or more configurable service quality thresholds, wherein the service quality algorithm correlates the home network diagnostic data with the mobility network diagnostic data;

based on the executing, generating a first recommended action comprising enabling a remote rebooting operation of the CPE;

based on the executing, generating a second recommended action comprising a notification of a service outage associated with the fixed wireless broadband services; and providing a response to the request for diagnostic based on the first recommended action, the second recommended action, or both.

2. The device of claim 1, wherein the obtaining the home network diagnostic data further comprises receiving a series of data signals indicative of an operation status of the CPE in a fixed wireless broadband network.

3. The device of claim 2, wherein the obtaining mobility network diagnostic data further comprises receiving performance statistics of the network equipment including one or more cell towers and a cellular connections status.

4. The device of claim 1, wherein the obtaining the home network diagnostic data further comprises obtaining a series of HTTP bulk data heartbeats from the CPE, wherein the CPE further includes one or more residential gateways.

5. The device of claim 1, wherein the generating the first recommended action further comprises enabling the users of the fixed wireless broadband services to remotely reboot the CPE.

6. The device of claim 1, wherein the request for diagnostic of fixed wireless broadband services further comprises a request for service quality from the users of the fixed wireless broadband services indicative of uplink speed and downlink speed, a signal quality, tower congestion, or a combination thereof.

7. The device of claim 6, wherein the operations further comprise:

storing one or more configurable service quality thresholds;

executing a service quality algorithm; and storing a signal quality received from the CPE and the network equipment.

8. The device of claim 6, wherein the obtaining the home network diagnostic data further comprises obtaining the home network diagnostic data periodically and as daily bulk data key performance indicators.

9. The device of claim 1, wherein the generating the second recommended action further comprises requesting and retrieving a current GPS location of a user's mobile equipment.

10. A non-transitory machine-readable medium, comprising executable instructions that, when executed by a processing system of a diagnostic as service platform including a processor, facilitate performance of operations, the operations comprising:

receiving home network diagnostic data from customer premise equipment (CPE) connected to a mobility network and operating in a fixed wireless broadband network;

receiving network data from mobility network equipment, wherein the network data comprises congestion information for one or more cell towers serving the CPE and a connection status of the CPE with the one or more cell towers;

receiving a request for diagnostic of fixed wireless broadband services comprising a request for diagnostic data indicative of a connection status of the fixed wireless broadband services;

sending, to the CPE, one or more real-time queries in response to the request for diagnostic of the fixed wireless broadband services;

receiving a response to the one or more real-time queries from the CPE;

receiving CPE data included in a daily bulk feed; and upon detection of anomalies in the response, the daily bulk feed, or both, generating a set of recommended actions comprising enabling a remote reboot operation of the CPE or notifying of a service outage associated with the fixed wireless broadband services.

11. The non-transitory machine-readable medium of claim 10, wherein the receiving the home network diagnostic data further comprises receiving a series of HTTP bulk data heartbeats.

12. The non-transitory machine-readable medium of claim 10, wherein the generating the set of recommended actions further comprises enabling users of fixed wireless broadband services to remotely reboot the CPE.

13. The non-transitory machine-readable medium of claim 10, wherein the generating the set of recommended actions further comprises notifying users of fixed wireless broadband services of known outages.

14. The non-transitory machine-readable medium of claim 10, wherein the operations further comprise generating a microservice application interface layer that correlates the set of recommended actions for the CPE and for the mobility network.

15. A method, comprising:

monitoring, by a processing system including a processor of a diagnostic as services (DaaS) system, a home network operation status via customer premise equipment (CPE) connected with a mobile network, wherein the CPE operates in fixed wireless broadband services;

monitoring, by the processing system, a mobility network operation and connection status via network equipment;

receiving, by the processing system, a request for diagnostic of the fixed wireless broadband services comprising a request for diagnostic data indicative of a connection status of the fixed wireless broadband services;

sending, by the processing system and responsive to the request for diagnostic, one or more real-time queries to the CPE;

receiving, by the processing system, a response to the one or more real-time queries from the CPE;

receiving, by the processing system, a daily bulk feed of CPE data including a series of HTTP bulk data heartbeats;

running, by the processing system, diagnostic on the home network operation status and the mobility network operation and connection status, periodically and as daily bulk data key performance indicators or as a real time CPE check, wherein the diagnostic includes applying one or more configurable service quality thresholds to correlate home network diagnostic data with mobility network diagnostic data including congestion information for one or more cell towers serving the CPE;

based on the diagnostic, generating, by the processing system, a first set of recommended actions in connection with the CPE, wherein the first set of recommended actions includes enabling a remote reboot operation of the CPE;

based on the diagnostic, generating, by the processing system, a second set of recommended actions in connection with a mobility network, wherein the second set of recommended actions includes notifying of a service outage associated with the fixed wireless broadband services or avoiding a congested one of the one or more cell towers; and outputting a diagnostic as a service recommended resolution that correlates the first set of recommended actions and the set of second recommended actions.

16. The method of claim 15, wherein the receiving the request for diagnostic further comprises:

receiving a request for a current signal quality and an indication that the current signal quality is below optimal or normal quality; and receiving a request for known outages impacting the home network operation status, the mobility network operation and connection status, and the connection status.

17. The method of claim 15, wherein the receiving the request for diagnostic further comprises receiving the request from a digital account associated with a user of the fixed wireless broadband services.

18. The method of claim 16, further comprising:

in response to receiving the request for the current signal quality, storing, by the processing system, the one or more configurable service quality thresholds; and based on the diagnostic that has been run, storing, by the processing system, a signal quality history of the CPE to be associated with an account of a user who has requested the current signal quality.

19. The method of claim 15, wherein the generating the first set of recommended actions further comprise remotely rebooting the customer premise equipment.

20. The method of claim 15, wherein the generating the second set of recommended actions further comprise notifying users of the fixed wireless broadband services of known outages and avoiding congested cellular towers.

* * * * *